United States Patent
Achkir et al.

(10) Patent No.: US 8,170,829 B1
(45) Date of Patent: May 1, 2012

(54) TESTER BUNDLE

(75) Inventors: D. Brice Achkir, San Jose, CA (US); Matt Heston, Leander, TX (US); Marco Mazzini, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 396 days.

(21) Appl. No.: 12/054,361

(22) Filed: Mar. 24, 2008

(51) Int. Cl.
*G01P 21/00* (2006.01)

(52) U.S. Cl. .......... 702/122; 702/57; 702/108; 702/111; 702/121

(58) Field of Classification Search .......... 702/57, 702/108, 122
See application file for complete search history.

(56) References Cited

U.S. PATENT DOCUMENTS

| | | | |
|---|---|---|---|
| 5,179,302 A | 1/1993 | Wagner | |
| 5,671,252 A | 9/1997 | Kovacs et al. | |
| 5,774,505 A | 6/1998 | Baugh | |
| 5,940,441 A | 8/1999 | Cranford et al. | |
| 6,069,522 A | 5/2000 | Venkatraman et al. | |
| 6,144,697 A | 11/2000 | Gelfand et al. | |
| 6,233,107 B1 | 5/2001 | Minuhin | |
| 6,285,709 B1 | 9/2001 | Alelyunas et al. | |
| 6,446,867 B1 * | 9/2002 | Sanchez | 235/454 |
| 6,801,307 B2 * | 10/2004 | Ziegler et al. | 356/73.1 |
| 6,968,167 B1 | 11/2005 | Wu et al. | |
| 6,968,168 B1 | 11/2005 | Collier et al. | |
| 7,016,406 B1 | 3/2006 | Phanse et al. | |
| 7,054,606 B1 | 5/2006 | Sheng et al. | |
| 7,302,461 B2 | 11/2007 | Mukherjee et al. | |
| 7,471,897 B1 * | 12/2008 | Theodoras et al. | 398/22 |
| 7,522,847 B2 * | 4/2009 | Momtaz et al. | 398/209 |
| 2004/0044713 A1 | 3/2004 | Healey et al. | |
| 2004/0083192 A1 * | 4/2004 | Elliott | 706/26 |
| 2004/0151268 A1 | 8/2004 | Hidaka | |
| 2005/0019042 A1 | 1/2005 | Kaneda et al. | |
| 2005/0024151 A1 | 2/2005 | Chuan | |
| 2005/0123036 A1 | 6/2005 | Rahman et al. | |
| 2005/0265717 A1 * | 12/2005 | Zhou | 398/9 |
| 2006/0133813 A1 * | 6/2006 | Ekkizogloy et al. | 398/135 |
| 2006/0189220 A1 * | 8/2006 | Duval et al. | 439/760 |
| 2007/0036084 A1 * | 2/2007 | Lindsay et al. | 370/246 |
| 2008/0044141 A1 * | 2/2008 | Willis et al. | 385/88 |

(Continued)

FOREIGN PATENT DOCUMENTS

EP    0808046 A2    11/1997
(Continued)

OTHER PUBLICATIONS

Mazzini, M. and Schube, S., SFP+ Interoperability Demonstration White Paper, Sep. 2008, Ethernet Alliance, version 1.0, pp. 1-18.*

(Continued)

*Primary Examiner* — Drew A Dunn
*Assistant Examiner* — Mischita Henson (57) ABSTRACT

An apparatus for testing multiple Small Form-Factor Pluggable Plus (SFP+) ports comprising: a first testing module; a second testing module; and a communications link coupled with the first and the second testing modules; wherein each of the testing modules includes: a SFP+ interface connectable to a port under test (PUT), a signal processing circuit including: a signal compensator configured to perform signal compensation on a signal received from the other testing module, and a signal modifier configured to: modify the compensated signal according to a set of predetermined modification parameters, and transmit the modified signal to the PUT.

20 Claims, 8 Drawing Sheets

U.S. PATENT DOCUMENTS

2008/0232397 A1* 9/2008 Muth .......................... 370/465

FOREIGN PATENT DOCUMENTS

WO           0213424 A2     2/2002

OTHER PUBLICATIONS

Nexans, Technology/Market Watch, Aug. 2007, Nexans, DCCC07082801, pp. 1-9.*

Balasubramonian, V. and Ghiasi, A., SFP+ Direct Attach Copper Interoperability Demonstration White Paper, Jul. 28, 2010, Ethernet Alliance, pp. 1-19.*

I., Dal A., et al., "SFF-8431 Specifications for Enhanced 8.5 and 10 Gigabit Small Form Factor Pluggable Module "SFP+"", SFF Committee; SFF-8431, Revision 2.0; www.sffcommittee.org; Saratoga, CA USA, (Aug. 30, 2007),1-104.

Clark, Randy et al., "SFF-8472 Diagnostic Monitoring Interface for Optical Transceivers", SFF-8472 Rev10.2; www.sffcommittee.org; Saratoga, CA USA, (Jun. 1, 2007),1-36.

Leeson, Kim et al., "A Cooperation Agreement for a Small Versatile 10 Gigabit Transceiver Package", X2MSA 10 Gigabit; Issue 2.0b, (Apr. 7, 2005),1-30.

Spilman, Antony "A Cooperation Agreement for 10 Gigabit Ethernet Transceiver Package", Xenpak SA, Rev 3.0, Issue 3.0, (Sep. 18, 2002),1-77.

Snively, Robert et al., "INF-8077I 10 Gigabit Small Form Factor Pluggable Module", INF-8077i, Revision 4.5; Saratoga, CA USA, (Aug. 31, 2005),1-192.

"IEEE Standard for Information Technology; Telecommunications and Information Exchange Between Systems—Local and Metropolitan Area Networks—Specific Requirements;", Part 3: Carrier Sense Multiple Access with Collision Detection (CSMA/CD) Access Method; IEEE Std 802.3aq-2006, (2006),1-62.

"SFF-8431 Specifications for Enhanced 8.5 and 10 Gigabit Small Form Factor Pluggable Module "SFP+"", Revision 1.3; SFF Committee; ftp:/ftp.seagate.com/sff, (Feb. 6, 2007),1-92.

"SFF Committee; INF-8074i Specification for SFP (Small Formfactor Pluggable) Transceiver", Rev 1.0; SFF Committee ftp://ftp.seagate.com/ff, (Mar. 12, 2001),1-38.

"Small Form-Factor Pluggable Transceiver", Wikipedia; www.wikipedia.com, (Mar. 12, 2008),1-3.

"Hydra Modular Test Systems", Circadiant Products; SFF-8431 SFP+ Electrical/Optical Comopliance System for Module, Host Card and IC Testing Applications, Circadiant Systems; www.circadiant.com/products/Hydra/SFP+/, (Feb. 26, 2008),1-2.

Garrido, et al., "A Comparative study of two adaptive continuous-time filters for decision feedback equalization read channels.", Circuits and Systems,1997.ISCAS '97.,Proceedings of 1997 IEEE International Symposium, vol. 1, (Jun. 9-12, 1997),89-92.

* cited by examiner

TESTER BUNDLE

TECHNICAL FIELD

This description relates to the testing of electro-optical equipment, and more specifically to the testing of transceiver ports of an optical device.

BACKGROUND

Compact optical or electrical transceivers are often used in optical communications for both telecommunication and data communications applications. The transceivers are frequently packaged into modules, which are self-contained interchangeable units. These modules often couple a cable (e.g., fiber optic or unshielded twisted pair networking cable) with a network device (e.g., a mother board, line card, host, card, etc.). Frequently, a host card is designed to accept a plurality of modules (e.g., a 8-port line card would generally accept 8 modules). In addition, these modules may vary in terms of transmitter and receiver type. For example, some modules may process optical signals (e.g., 850 nm, 1310 nm, 1550 nm optical standards). Whereas, other modules may process electrical signals. Frequently, these modules will present the host card with a common interface, allowing the module types to be interchanged. Modules are typically provided or manufactured based on one or more industry standards or specifications that may be supported by several component vendors.

In the electro-optical standard known as Small Form-Factor Pluggable Plus (SFP+) the more complex conditioning and processing of signals is generally the responsibility of the host card. Whereas, the raw transmittal and receipt of the signals is the responsibility of the modules. An electrical high speed serial interface between the host card and the SFP+ is generally used. The host electrical high speed serial interface may typically include a transmitter pre-emphasis and a receiver equalizer to overcome circuit board and other external media impairments.

Currently, the testing of electro-optical equipment includes the use of specialized testing equipment. Typically, the testing equipment is a large motherboard or card based system that generates signals and waveforms and analyzes received signals and waveforms. Such large systems are often costly and do not scale well.

DESCRIPTION OF EXAMPLE EMBODIMENTS

Overview

A system and/or method for testing devices and interfaces used in the communicating of information, is substantially as shown in and/or described in connection with at least one of the figures, as set forth more completely in the claims.

An apparatus is provided for testing multiple Small Form-Factor Pluggable Plus (SFP+) ports. The apparatus may include a first testing module, a second testing module, and a communications link coupled with the first and the second testing modules, wherein each of the testing modules includes: a SFP+ interface connectable to a port under test (PUT), a signal processing circuit including: a signal compensator configured to perform signal compensation on a signal received from the other testing module, and a signal modifier configured to: modify the compensated signal according to a set of predetermined modification parameters, and transmit the modified signal to the PUT.

A method is provided for testing the ports of a Small Form-Factor Pluggable Plus (SFP+) transceiver device. The method may include receiving, by a first testing module, a signal from a first SFP+ transceiver device port, transmitting the signal to a second testing module via a communications link, performing signal compensation on the signal received by the second testing module, modifying the compensated signal according to a set of predetermined modification parameters, and transmitting the modified signal to a second SFP+ transceiver device port.

Example Embodiments

Figure 1:
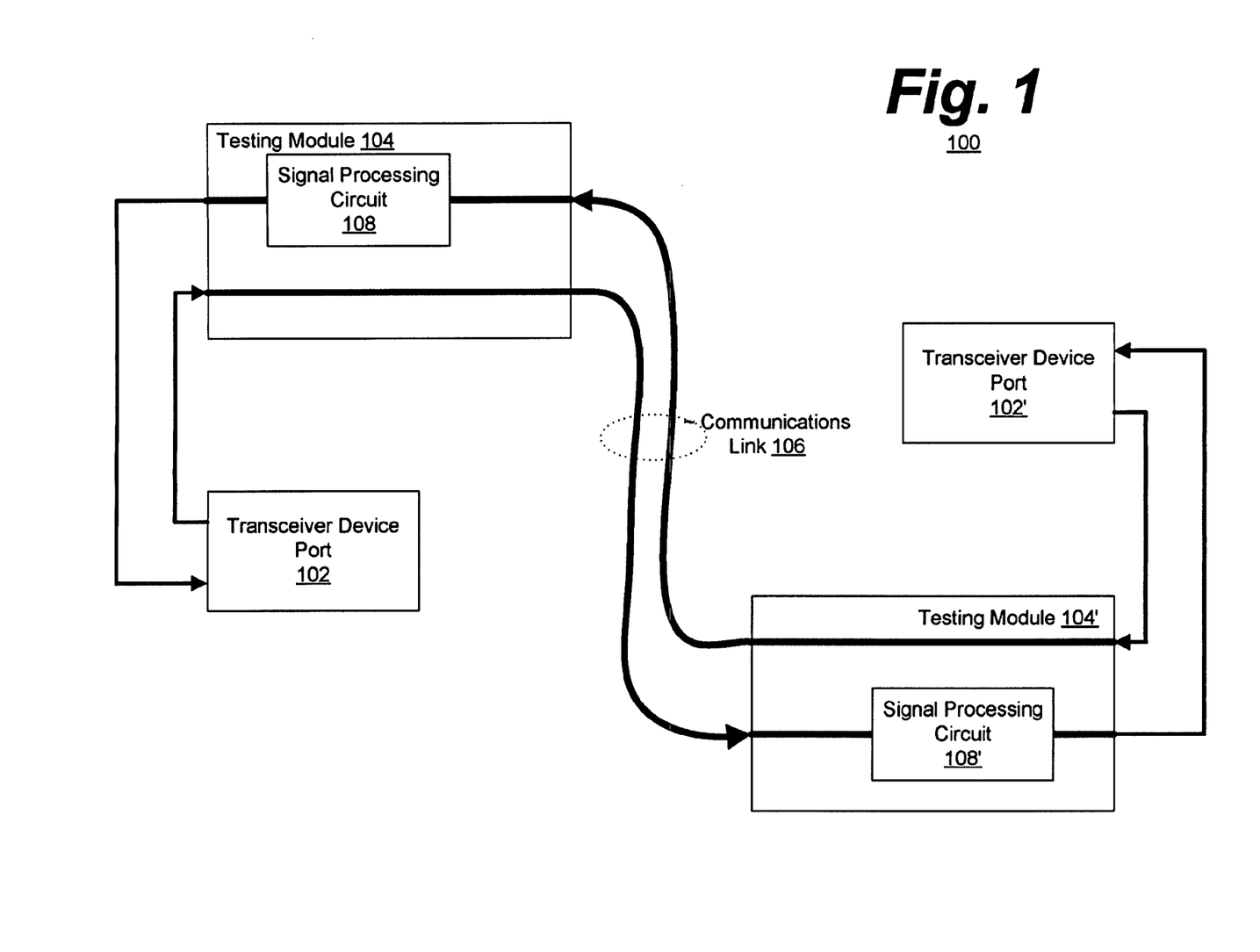
FIG. 1 is a block diagram of an embodiment of a system of for the testing of optical equipment.

FIG. 1 is a block diagram of an embodiment of a system 100 of for the testing of optical equipment. In one embodiment, the system 100 may include a pair of testing modules 104 and 104' and a communications link 106. In various embodiments, the testing modules 104 may be configured to be plugged in or connected to respective transceiver device ports 102 and 102'. These transceiver device ports 102 & 102' may also be referred to as ports under test (PUT).

In one embodiment, the first testing module 104 may be connected to a first PUT 102 and the second testing module 104' may be connected to a second PUT 102'. In such an embodiment, the first PUT 102 may send a signal through the first testing module 104 to the second testing module 104', via the communications link 106. The second testing module 104' may modify the signal in accordance with the parameters of the test and forward the modified signal to the second PUT 102'. In various embodiments, the second PUT 102' may confirm that the signal received is equivalent to an expected signal. In some embodiments, the test may be performed in reverse, with the second PUT 102' transmitting a signal, the signal being modified by the first testing module 104, and received by the first PUT 102. In the written description below most embodiments will be described as occurring from the first PUT 102 to the second PUT 102'; it is understood, however, that in many embodiments the testing may be bi-directional and may occur substantially simultaneously or in an overlapping fashion.

In one embodiment, the second PUT 102' may determine whether or not the received signal is equivalent to the signal transmitted by the first PUT 102. In such an embodiment, the system 100 may be used to test the tolerances or ability of the second PUT 102' to handle signal noise or distortion. However, it is understood that many other forms of testing may occur and that the above is merely one illustrative example to which the disclosed matter is not limited. In one embodiment, the transceiver device port 102 or port under test (PUT) may include a port substantially compliant with the Small Form-Factor Pluggable Plus (SFP+) multi-source agreement (MSA), its predecessors or derivatives (hereafter, "the SFP+ specification"). SFF Committee, *SFF*-8431 *Specifications for*

Enhanced 8.5 *and* 10 *Gigabit Small Form Factor Pluggable Module "SFP+"*, Revision 1.3, 16 Feb. 2007. It is understood that devices are rarely fully compliant with any given specification.

In this context, the devices compliant with the small form-factor pluggable plus (SFP+) standard may include a compact optical or electrical transceiver used in optical communications for, for example, both telecommunication and data communications applications. In various embodiments, the SFP+ standard may be able to support data rates up to 10.0 Gigabits per second and include support for the data rates for 8 Gigabit Fibre Channel, and 10 Gigabit Ethernet (GbE). In one embodiment, the system 100 may be configured to test the electrical portion of such SFP+ modules or ports.

In one embodiment, the testing module 104 may include a SFP+ interface that is connectable to a given port under test (e.g., transceiver device port 102), a transmission line, and a signal processing circuit 108. In various embodiments, the testing module 104 may be configured to pass signals received from the connected PUT 102 to the other testing module 104'. In such an embodiment, the testing module 104 may use the communications link 106 to transmit signals to the other testing module 104'.

In another embodiment, the testing module 104 may be configured to receive a signal from the other testing module 104' and modify the signal according to a set of predetermined modification parameters. In various embodiments, the modification may be performed by the signal processing circuit 108.

In some embodiments, the predetermined modification parameters may be chosen to determine the PUT's ability to correctly receive signals that have undergone distortion. In one specific illustrative example, the SFP+ specification details a list of parameters for testing a transceiver device (and ports thereof). These parameters include the effects of a worst case scenario, described in detail in the SFP+ specification, that must be met in order for the transceiver device to be considered compliant with the SFP+ specification. The SFP+ specification refers to these parameters as "stressors".

In one embodiment, three types of "stressors" or modification parameters may be used to distort the signal received by the testing module 104 from the other testing module 104'. In one embodiment, the modification parameters may include pre-cursor signal distortion, illustrated in one embodiment by FIG. 5. In one embodiment, the modification parameters may include symmetrical signal distortion, illustrated in one embodiment by FIG. 6. In one embodiment, the modification parameters may include post-cursor signal distortion, illustrated in one embodiment by FIG. 7. However, it is understood that the above are merely a few illustrative examples to which the disclosed subject matter is not limited. Other modification parameters may be used based upon the characteristics of the PUT that a user may wish to test.

In one embodiment, the communications link 106 may include a cable or group of cables connecting the first testing module 104 and the second testing module 104'. In one embodiment, the communications link 106 may include a Twinax cable. In this context a Twinax cable may include a twisted pair of electrical conductors. It is understood that the above are merely an illustrative example to which the disclosed subject matter is not limited. In embodiments of system 100 that operate on an optical-to-optical connection, as opposed to the electrical-to-electrical embodiment predominantly described herein, the communications link 106 may include a fiber optics connection.

Figure 2:
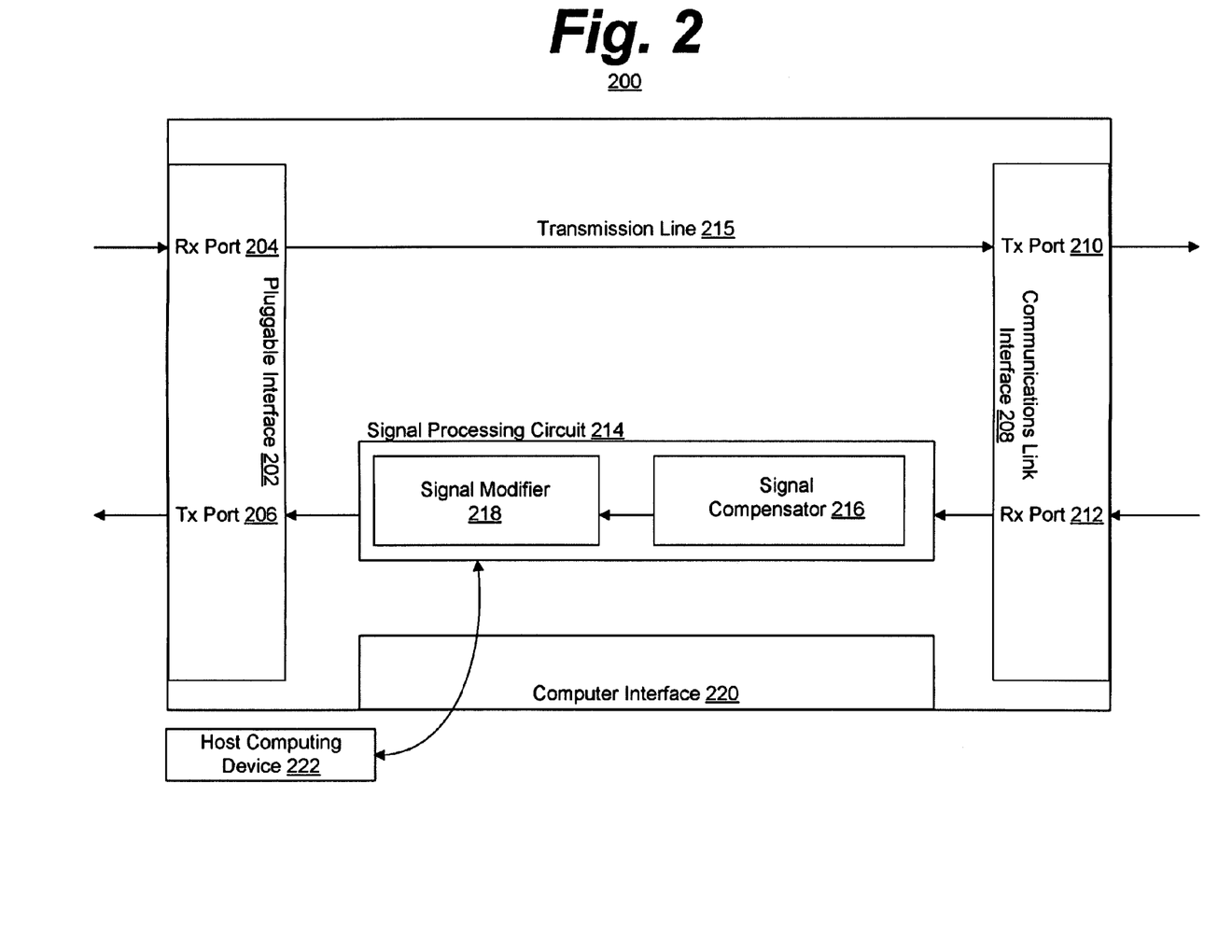
FIG. 2 is a block diagram of an embodiment of an apparatus of for the testing of optical equipment.

FIG. 2 is a block diagram of an embodiment of an apparatus 200 of for the testing of optical equipment. The apparatus 200 may include a testing module, such as for example, testing module 104 of FIG. 1. In one embodiment, the testing module 200 may include a pluggable interface 202, a communications link interface 208, a transmission line 215, and a signal processing circuit 214. In various embodiments, the testing module 200 may be sufficiently small to be held in the hand of an average sized adult human being.

In one embodiment, the pluggable interface 202 may be connectable to a port under test (PUT) that is part of a device under test (DUT). In various embodiments, the PUT may include a Small Form-Factor Pluggable Plus (SFP+) port. In such an embodiment, the pluggable interface 202 may be referred to as a SFP+ interface. The DUT may include a transceiver device. In various embodiments, the pluggable interface 202 may include a receiver (Rx) port 204 configured to receive signals from the PUT, and a transmitter (Tx) port 206 configured to transmit signals to the PUT.

In one embodiment, the communications link interface 208 may be connectable or, in various embodiments, connected to a communications link that facilitates the transmission of signals between a first and a second testing module (e.g., communications link 106 of FIG. 1). In various embodiments, the communications link interface 208 may include a receiver (Rx) port 212 configured to receive signals from another testing module, and a transmitter (Tx) port 210 configured to transmit signals to another testing module.

In one embodiment, the testing module 200 may include a transmission line 215 configured to facilitate the transmission of a signal from a connected PUT to another tester module, via a communication link. In one embodiment, the transmission line 215 may connect the receiving port 204 of the pluggable interface 202 with the transmitter port 210 of the communications link interface 208. In various embodiments, the transmission line 215 may be configured to perform no active modification of the signal as it is transmitted via the transmission line. It is understood that passive modification of the signal may, in one embodiment, occur either intentionally or as function of the medium used during transmission.

In one embodiment, the testing module 200 may include a signal processing circuit 214 configured to modify the signal, received from another testing module, according to a set of predetermined modification parameters. In another embodiment, the signal processing circuit 214 may modify the signal transmitted to the other testing module, or perform modifications on either the transmitted or received signals; these embodiments are not illustrated. In various embodiments, the signal processing circuit 214 may be configured to operate on electrical signals, whereas in other embodiments, the signal processing circuit 214 may be configured to operate on optical signals.

In one embodiment, the signal processing circuit 214 may include a signal compensator 216 configured to perform signal compensation on a signal received from a second testing module. In various embodiments, the signal may experience distortion (e.g., dispersion, attenuation or other distortion) during transmission via the transmission line of the other testing module and the communications link. In such an embodiment, the signal compensator 216 may attempt to compensate for such passive distortion. In one embodiment, the signal compensator 216 may be configured to perform Electrical Dispersion Compensation (EDC).

In one embodiment, the signal processing circuit 214 may include a signal modifier 218 configured to modify the compensated signal according to a set of predetermined modification parameters. In one embodiment, the signal modifier 218 may also be configured to transmit the modified signal to the connected PUT via the pluggable interface 202.

In one embodiment, the signal processing circuit 214 may be configured to modify the compensated signal in a manner substantially compliant with the modification parameters enumerated in the Small Form-Factor Pluggable Plus (SFP+) standard. Various, but non-limiting, embodiments of such modification parameters are described above, and illustrated in FIGS. 5, 6, and 7. In one embodiment, the signal modifier 218 may be configured to facilitate calibration of the predetermined modification parameters.

In one embodiment, the signal processing circuit 214 may be configured to modify the data rate of the signal. In one embodiment, the signal may include, for example, a data rate of ~10 Gigabits per second. In such an embodiment, the signal processing circuit 214 may be configured to modify the signal to a data rate of 9 Gigabits per second, or a data rate of 11 Gigabits per second, as examples. In various embodiments, the signal processing circuit 214 may include a memory (not illustrated) to buffer the signal.

In one embodiment, the testing module 200 may include a computer interface 220 configured to communicatively couple the tester module with a host computing device 222. In one embodiment, the computer interface 220 may include an interface substantially complaint with the Universal Serial Bus (USB) standard, its predecessors or derivatives.

In one embodiment, the computer interface 220 may be configured to receive a set of modification parameters from the host computing device 222. The signal modifier 218 may then use those new modification parameters to modify any received signals. In various embodiments, the computer interface 220 may be configured to establish a series of modification parameters to be used in a sequence or set of conditional events. In one embodiment, the computer interface 220 may be configured to assist in or facilitate the calibration of the set of modification parameters.

In one embodiment, the communications link interface 208 may be configured to route signals from the transmission line 215 to the signal processing circuit 214. In such an embodiment, the testing module 200 may be configured to receive a signal from the PUT and loop it back to the same PUT. In another embodiment, the communications link may be wired or configured to route a signal from the TX port 210 to the RX port 212 of the communications link interface 208.

Figure 3:
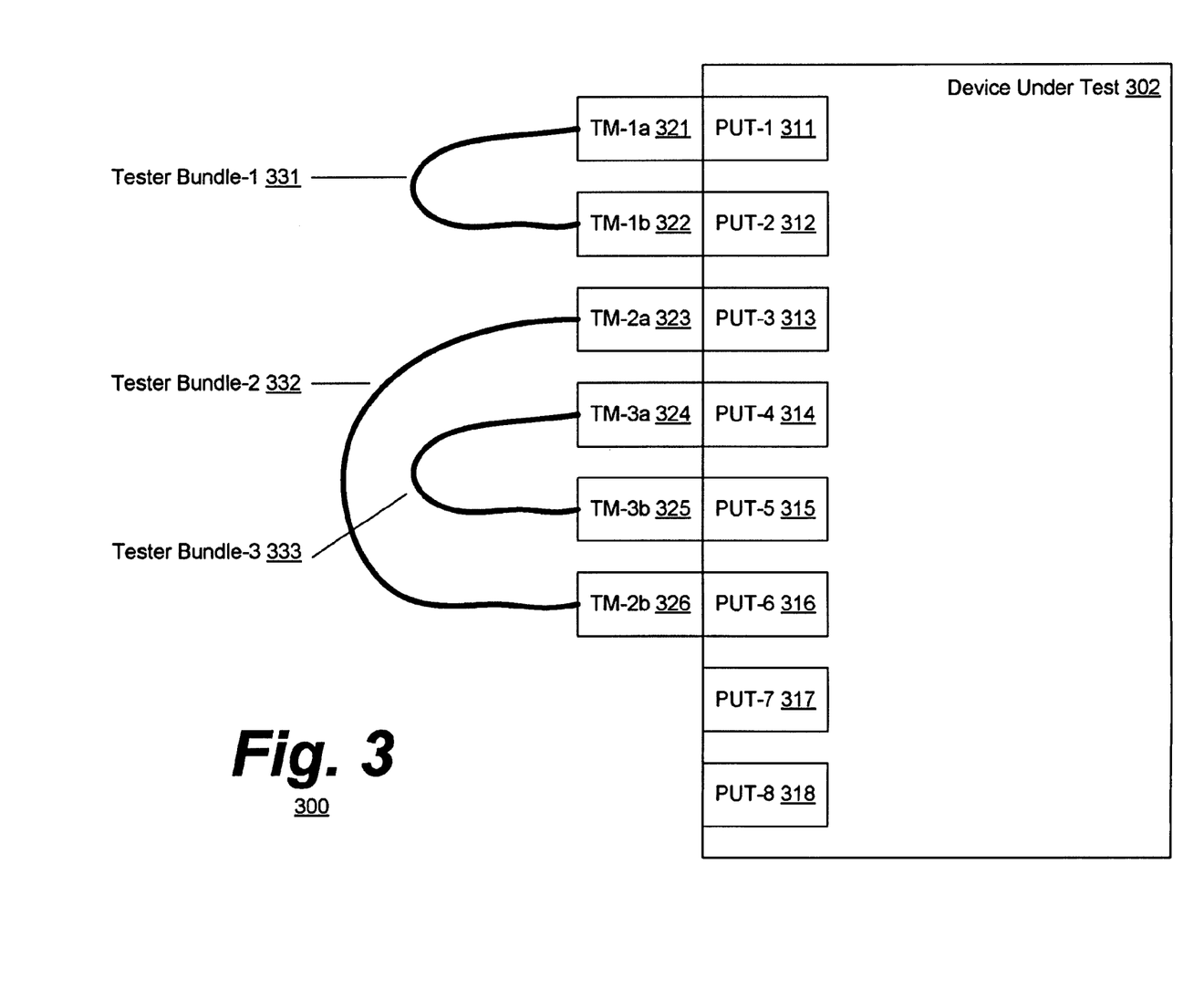
FIG. 3 is a block diagram of an embodiment of a system of for the testing of optical equipment.

FIG. 3 is a block diagram of an embodiment of a system 300 of for the testing of optical equipment. In one embodiment, the system 300 may include a device under test (DUT) 302 and a number of tester bundles (e.g., tester bundle-1 331, tester bundle-2 332, and tester bundle-3 333). In one embodiment, the DUT 302 may include a number of ports under test (PUTs). In such an embodiment, the DUT 302 may include eight ports: PUT-1 311, PUT-2 312, PUT-3 313, PUT-4 314, PUT-5 315, PUT-6 316, PUT-7 317, and PUT-8 318. FIG. 3 illustrates an example in which three tester bundles are used to test six ports, and two ports not actively under test. It is understood that the above are merely a few illustrative examples to which the disclosed subject matter is not limited.

In one embodiment, tester bundle-1 331 may include two testing modules (TM-1a 321 and TM-1b 322) coupled via a communications link. Testing module 1a 321 may be coupled with PUT-1 311 and testing module 1b 323 may, in one embodiment, be coupled with PUT-2 312. In such an embodiment, PUT-1 311 may transmit a signal through TM-1a 321 into TM-1b 322. TM-1b may modify this signal using a set of predetermined modification parameters and transmit the signal to PUT-2 312. PUT-2 312, a portion of DUT 302, or a device coupled with DUT 302 may check the received signal and determine whether or not the received signal conforms to an expected result. For example, in one embodiment, the expected result may be that the received signal is equivalent to the signal transmitted signal from PUT-1 311 and that PUT-2 312 properly compensated for the distortion introduced by TM-1b 322; however, it is understood that the above is merely an illustrative example to which the disclosed subject matter is not limited.

Likewise, a signal may be sent, in one embodiment, from PUT-2 312 through TM-1b 322 into TM-1a 321. TM-1a may modify this signal to using a set of predetermined modification parameters and transmit the signal to PUT-1 311. In various embodiments, these signal transmissions may overlap, or occur substantially simultaneously. In such an embodiment, two ports may be tested at once.

Similar actions may occur for tester bundle-2 332 and tester bundle-3 333. In one embodiment, tester bundle-2 332 may include two testing modules (TM-2a 323 and TM-2b 326) coupled via a communications link. In one embodiment, tester bundle-3 333 may include two testing modules (TM-3a 324 and TM-1b 324) coupled via a communications link. In some embodiments, the use of three tester bundles may allow for the near simultaneous testing of six ports.

In various embodiments, the tester bundles may be used to test ports on different devices under test (DUTs). For example, a second DUT (not shown) may be coupled with the first DUT 302 via a tester bundle. A first testing module may be coupled with a PUT of the first DUT and a second testing module may be coupled with a PUT of the second DUT. In various embodiments, the two DUTs need not be physically co-located. For example, the communications link of the tester bundle may include a link having a distance of many meters or even kilometers (km).

Figure 4A:
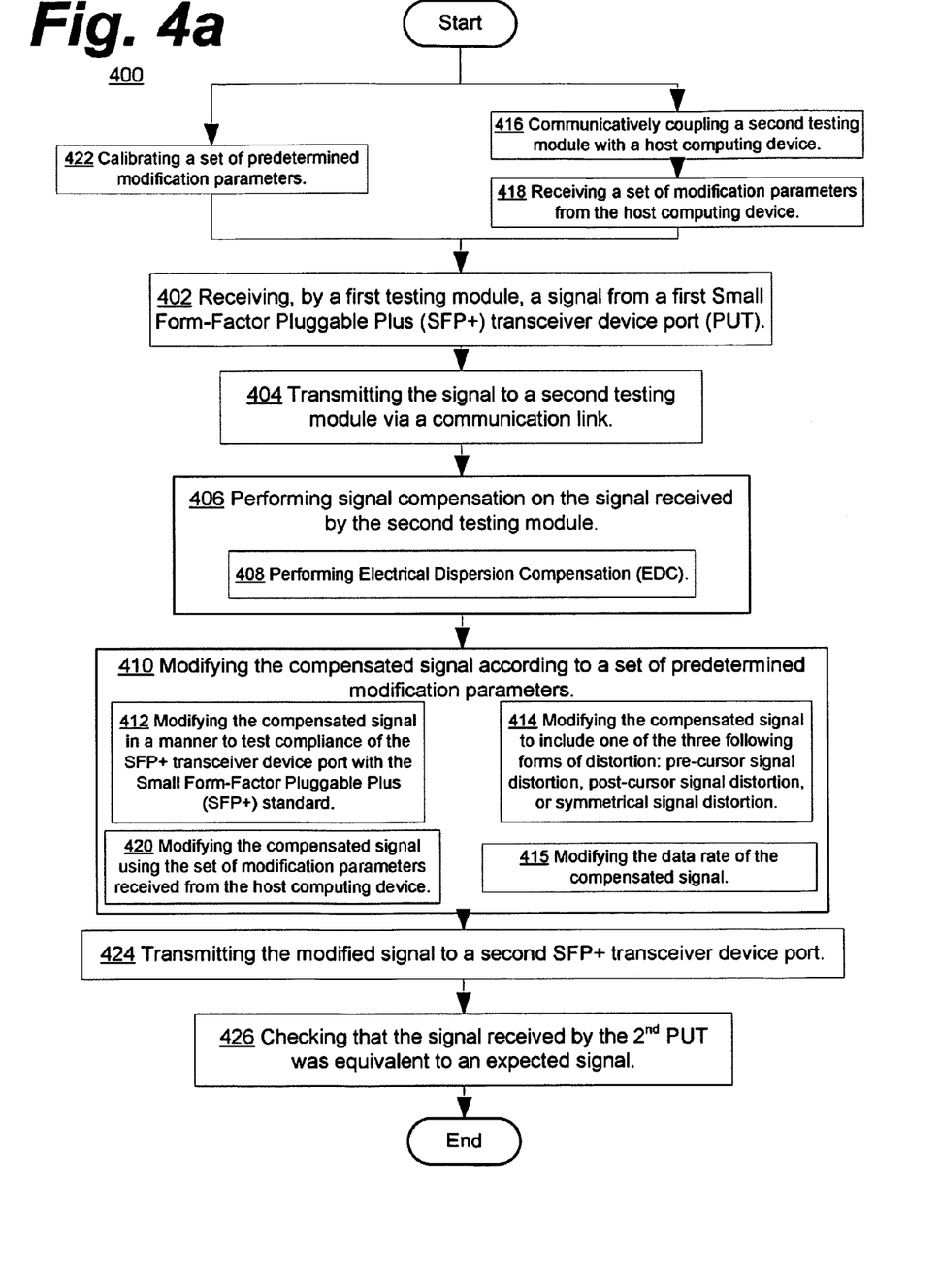
FIG. 4 is a flow chart of an embodiment of a technique of for the testing of optical equipment.
Figure 4B:
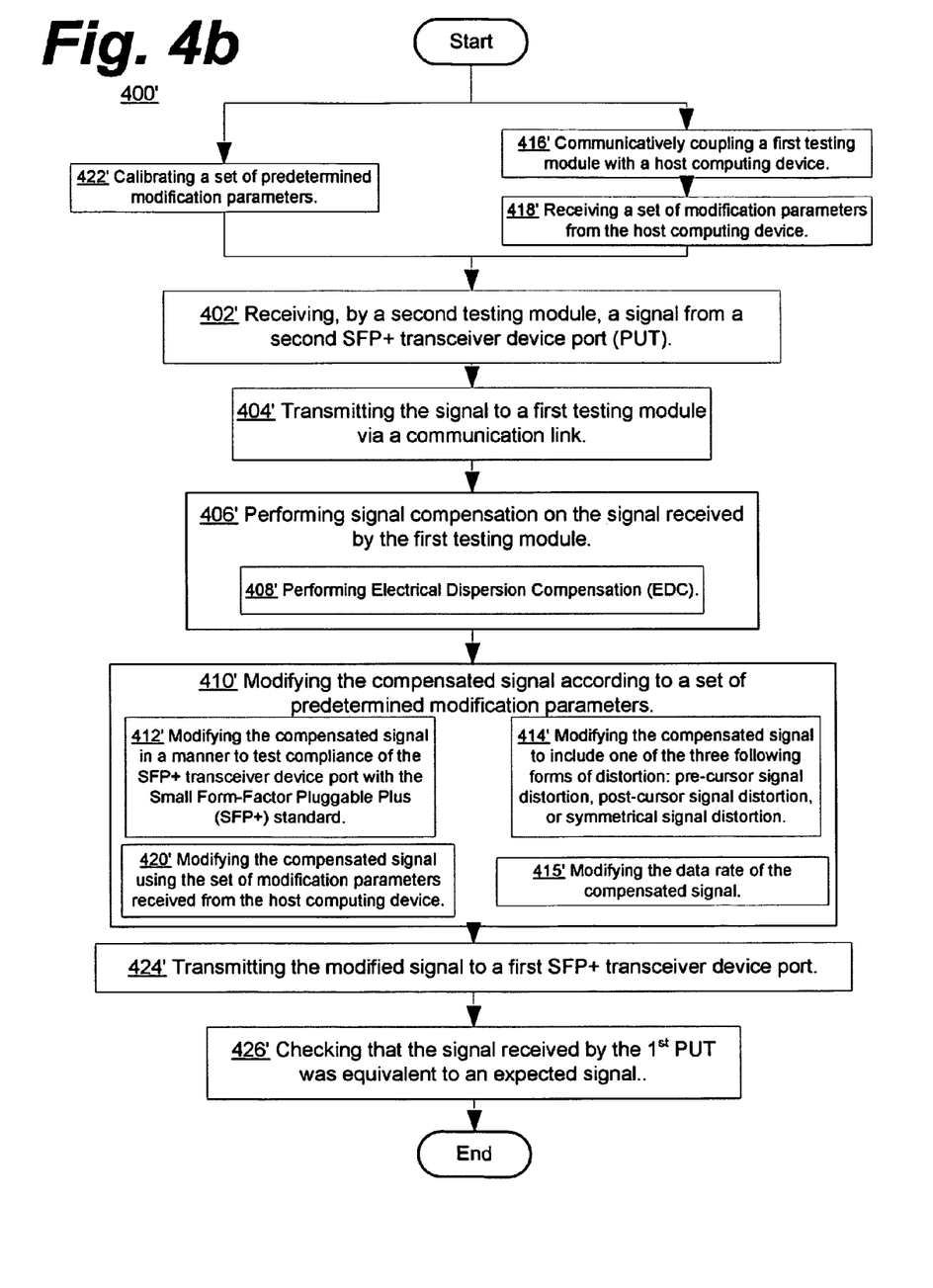

FIG. 4 is a flow chart of an embodiment of a technique 400 of for the testing of optical equipment. It is understood that FIGS. 4a and 4b represent a single flowchart illustrated on two pages. FIG. 4a illustrates a technique 400 for testing from a first testing module to a second testing module. FIG. 4b illustrates an analogous technique 400' of testing from a second testing module to a first testing module. It is understood that these two techniques may be performed, in various embodiments, in isolation, series, parallel, or overlapping fashion. Hereafter and here-before, the flowchart of the techniques 400 and 400' are simply referred to as FIG. 4, as if the flowchart merely occupied a single page.

In one embodiment, the technique 400 may be performed relatively quickly. In various embodiments, the technique 400 may be performed in less than two minutes. In such an embodiment, given the bi-directional nature of techniques 400 and 400', two SFP+ transceiver device ports or other PUTs may be tested within a two minute time frame. Furthermore, in some embodiments, in which a testing module is sufficiently small to be handheld, a number of tester bundles may be used in parallel or overlapping fashion, such as for example the embodiment illustrated in FIG. 3. In such an embodiment, six ports may be tested within two minutes. It is understood that the above are merely a few illustrative examples to which the disclosed subject matter is not limited.

Block 402 illustrates that, in one embodiment, a first testing module may receive a signal from a first Small Form-Factor Pluggable Plus (SFP+) transceiver device port. In various embodiments, the testing module 104 of FIG. 1 may receive the signal from a first transceiver device port or PUT 102 of FIG. 1, as described above. In another embodiment, the testing module 1a 321 of FIG. 3 may receive the signal from a first PUT-1 311 of FIG. 3, as described above. In various embodiments, the testing module may be coupled with the PUT via a pluggable interface such as pluggable interface 202 of FIG. 2, as described above.

Block 404 illustrates that, in one embodiment, the signal may be transmitted to a second testing module via a communication link. In one embodiment, communications link 106 of FIG. 1 may transmit the signal. In another embodiment, the transmission line 215 of FIG. 2 may also aid in transmitting the signal, as described above. In some embodiments, the testing module 104' of FIG. 1 or the testing module TM-1b 322 of FIG. 3 may the target of the transmission, as described above.

Block 406 illustrates that, in one embodiment, signal compensation may be performed on the signal received by the second testing module. In various embodiments, the signal may become distorted due to transmission through the communications link. In such an embodiment, the signal compensation may attempt to correct or compensate for any unwanted distortion. Block 408 illustrates that, in one embodiment, signal compensation may include Electrical Dispersion Compensation (EDC). In one embodiment, the signal compensation may be performed by the signal processing circuit 214 or the signal compensator 216 of FIG. 2, as described above.

Block 410 illustrates that, in one embodiment, the compensated signal may be modified according to a set of predetermined modification parameters, as described above. Block 412 illustrates that, in one embodiment, the compensated signal may be modified in a manner to test compliance of the SFP+ transceiver device port with the Small Form-Factor Pluggable Plus (SFP+) standard, as described above. Block 414 illustrates that, in one embodiment, the compensated signal may be modified to include one of the three following forms of distortion: pre-cursor signal distortion, post-cursor signal distortion, or symmetrical signal distortion, as described above and illustrated, for example, in FIGS. 5, 6, and 7. Block 415 illustrates that, in one embodiment, the data rate of the signal may be modified, as described above. In one embodiment, the signal modifier 218 or the signal processing circuit 214 of FIG. 2 may modify the signal, as described above.

Block 416 illustrates that, in one embodiment, a host computing device may be communicatively coupled with the second testing module. In one embodiment, the computer interface 220 of FIG. 2 may facilitate the coupling, as described above.

Block 418 illustrates that, in one embodiment, the second testing module may receive a set of modification parameters form the hosting computing device, as described above. In one embodiment, the signal modifier 218 or the signal processing circuit 214 of FIG. 2 may receive the set of modification parameters, as described above.

Block 420 illustrates that, in one embodiment, the compensated signal or signals subsequently received in the future may be modified using the set of modification parameters received from the host computing device. In one embodiment, the signal modifier 218 or the signal processing circuit 214 of FIG. 2 may use the set of modification parameters, as described above.

Block 424 illustrates that, in one embodiment, the modified signal may be transmitted to a second SFP+ transceiver device port or PUT. In one embodiment, the second transceiver device port 102' of FIG. 1 or, in another embodiment, the second PUT-2 312 of FIG. 3 may receive the modified signal. In various embodiments, the second testing module 104' of FIG. 1, the pluggable interface 202 of FIG. 2, or the second testing module TM-1b 322 of FIG. 3 may transmit the signal.

Block 426 illustrates that, in one embodiment, the signal received by the second PUT may be checked to determine whether or not it is equivalent to an expected signal, e.g., the signal transmitted by the first PUT. In one embodiment, the DUT 302 of FIG. 3 may perform the determination. In various embodiments, other checks may be made on the received signal. For example, in one embodiment, the received signal may not be expected to be equivalent to the signal transmitted by the first PUT; however, it is understood that the above are merely a few illustrative examples to which the disclosed subject matter is not limited.

As described above, FIG. 4b illustrates a technique 400' analogous to the technique 400 of FIG. 4a. FIG. 4b illustrates a technique 400' of testing from a second testing module to a first testing module. It is understood that these two techniques may be performed, in various embodiments, in isolation, series, parallel, or overlapping fashion.

In such a technique, Block 402 may be analogous to Block 402'. Block 404 may be analogous to Block 404'. Block 406 may be analogous to Block 406'. Block 408 may be analogous to Block 408'. Block 410 may be analogous to Block 410'. Block 412 may be analogous to Block 412'. Block 414 may be analogous to Block 414'. Block 415 may be analogous to Block 415'. Block 416 may be analogous to Block 416'. Block 418 may be analogous to Block 418'. Block 420 may be analogous to Block 420'. Block 422 may be analogous to Block 422'. Block 424 may be analogous to Block 424'. Block 426 may be analogous to Block 426'.

Figure 5:
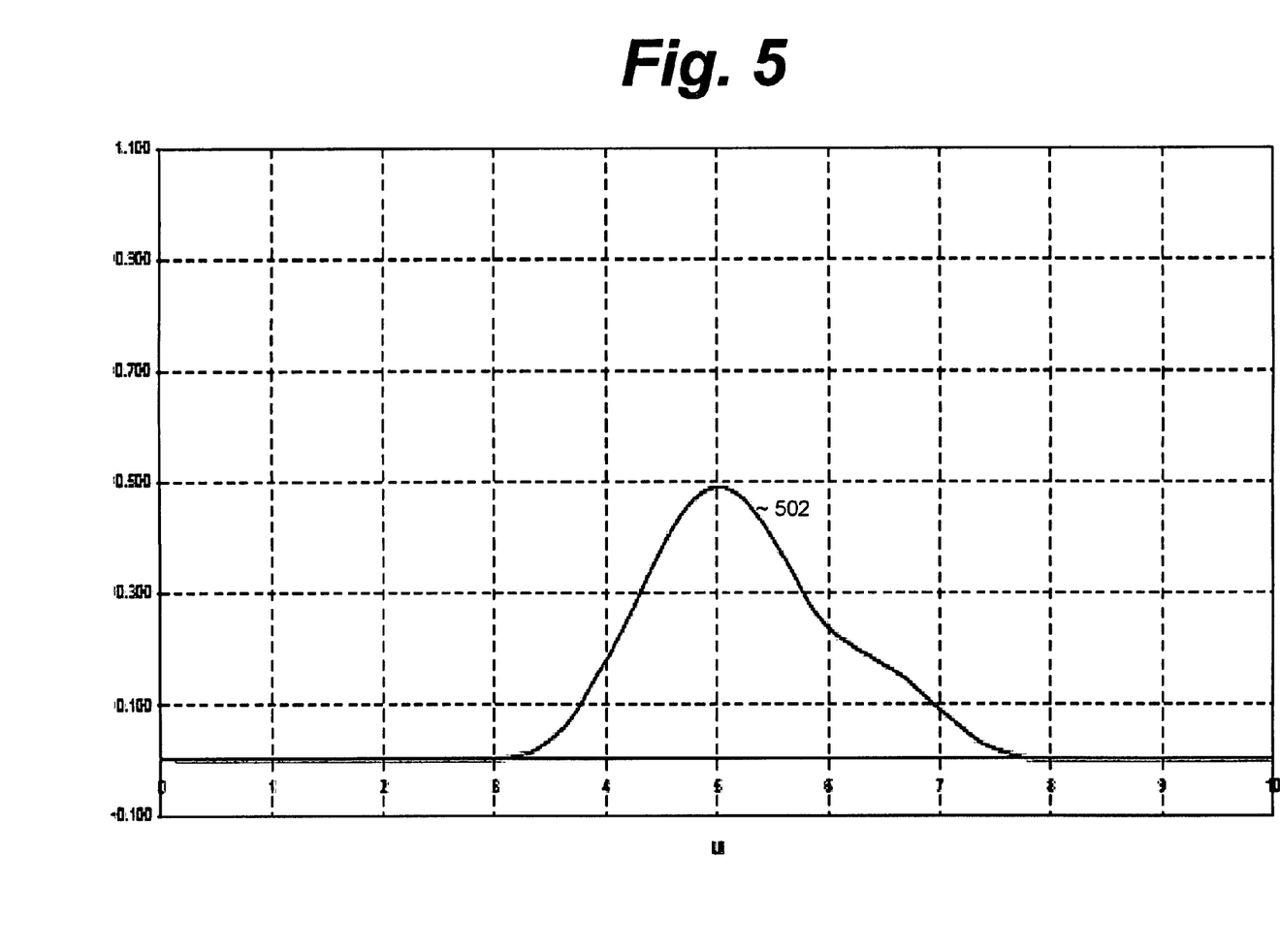
FIG. 5 is a graph of an embodiment of a set of predefined modification parameters for the testing of optical equipment.

FIG. 5 is a graph of an embodiment of a set of predefined modification parameters 502 for the testing of optical equipment. Such a set of modification parameters 502 may define a pre-cursor signal distortion that may be used to modify the compensated signal. In one embodiment, the signal processing circuit of FIG. 1 or the signal modifier 218 of FIG. 2 may modify the signal to include the distortion illustrated by FIG. 5.

Figure 6:
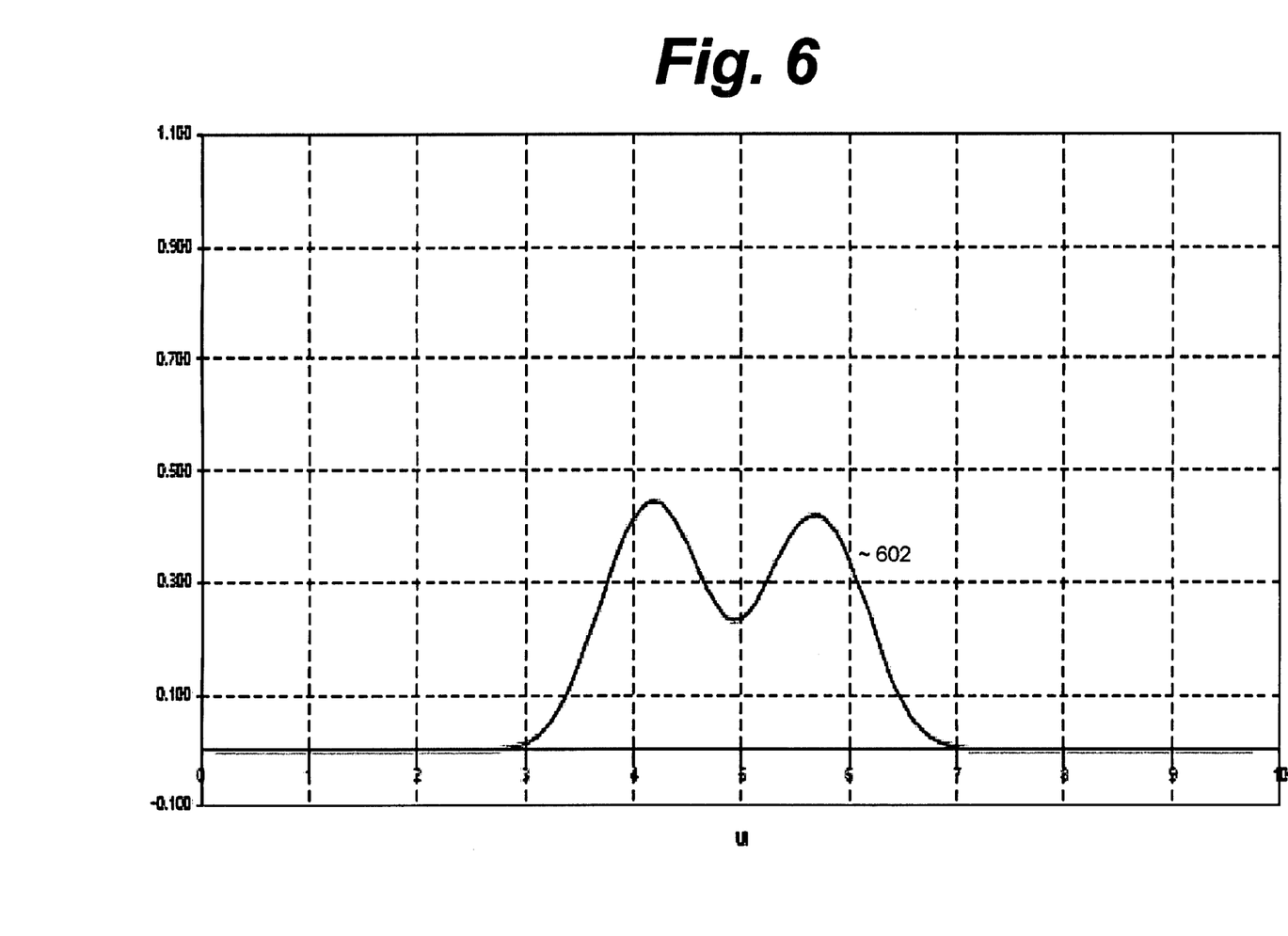
FIG. 6 is a graph of an embodiment of a set of predefined modification parameters for the testing of optical equipment.

FIG. 6 is a graph of an embodiment of a set of predefined modification parameters 602 for the testing of optical equipment. Such a set of modification parameters 602 may define a substantially symmetrical signal distortion that may be used to modify the compensated signal. In one embodiment, the signal processing circuit of FIG. 1 or the signal modifier 218 of FIG. 2 may modify the signal to include the distortion illustrated by FIG. 6.

Figure 7:
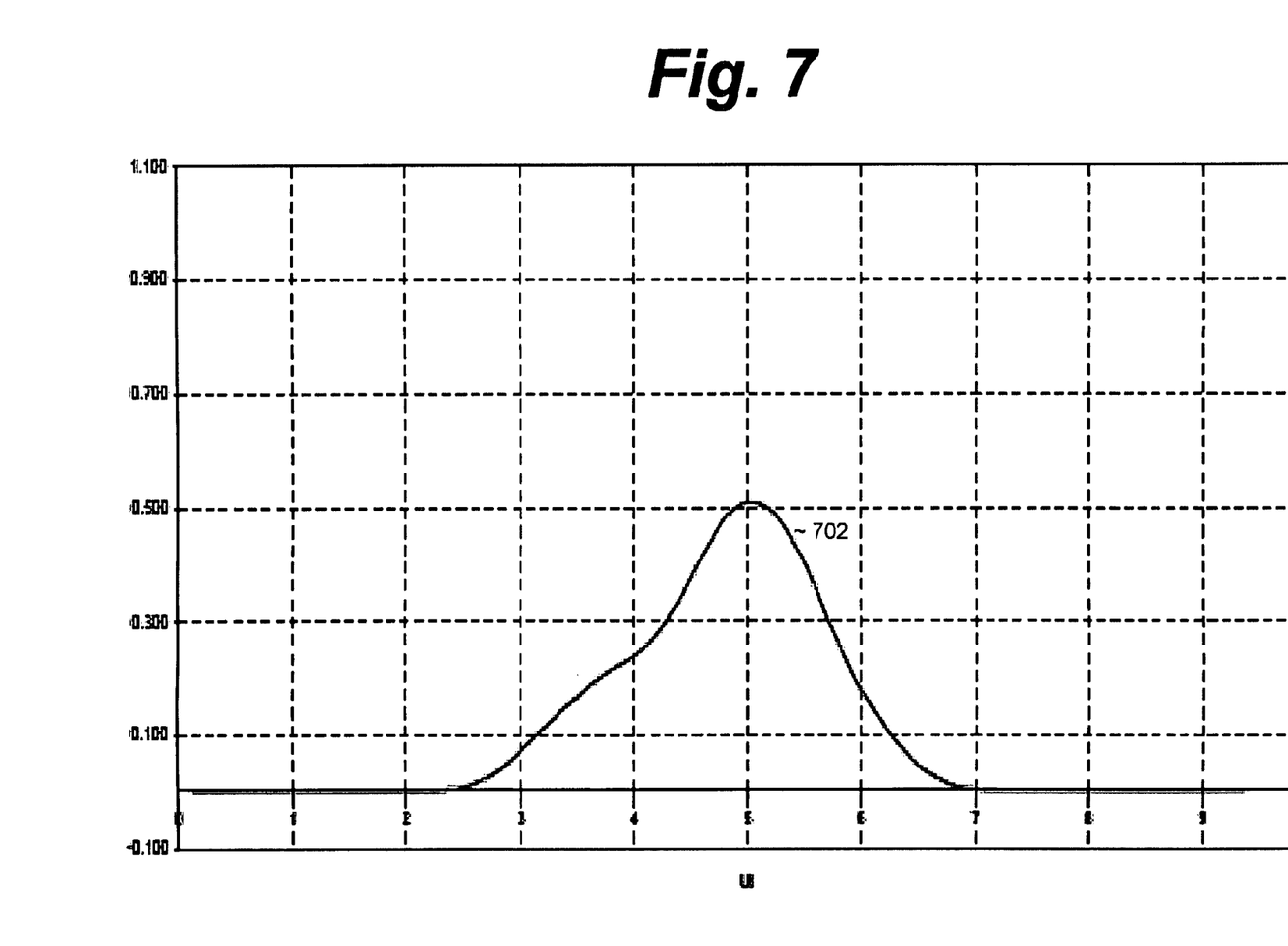
FIG. 7 is a graph of an embodiment of a set of predefined modification parameters for the testing of optical equipment.

FIG. 7 is a graph of an embodiment of a set of predefined modification parameters for the testing of optical equipment. Such a set of modification parameters 702 may define a pre-cursor signal distortion that may be used to modify the compensated signal. In one embodiment, the signal processing circuit of FIG. 1 or the signal modifier 218 of FIG. 2 may modify the signal to include the distortion illustrated by FIG. 7.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus for testing multiple Small Form-Factor Pluggable Plus (SFP+) ports comprising:
   a first testing module;
   a second testing module; and
   a communications link coupled with the first and the second testing modules;
   wherein each of the testing modules includes:
      a SFP+ interface connectable to a port under test (PUT),
      a signal processing circuit including:
         a signal compensator configured to generate a compensated signal by performing signal compensation on a signal received from the other testing module, and
         a signal modifier configured to:
            generate a modified signal by introducing signal distortion to the compensated signal according to a set of predetermined modification parameters, and
            transmit the modified signal, via the SFP+ interface, to the respective port under test.

2. The apparatus of claim 1 wherein the signal compensator of each of the tester modules is configured to perform Electrical Dispersion Compensation (EDC) on the signal received from the other testing module.

3. The apparatus of claim 1 wherein the signal modifier of each of the testing modules is configured to modify the compensated signal in order to create one signal distortion selected from the following three signal distortions:
   a pre-cursor signal distortion,
   a post-cursor signal distortion, or
   a substantially symmetrical signal distortion.

4. The apparatus of claim 1 wherein the signal modifier of the testing modules are each configured to facilitate calibration of the predetermined modification parameters.

5. The apparatus of claim 1 wherein each testing module includes a transmission line configured to facilitate the transmission of a signal from the connected PUT to the other testing module, via the communications link; and
   each testing module is configured to transmit the signal from the respective PUT, via the transmission line of the testing module and the communication link, to the signal processing circuit of the other testing module, without active modification of the signal.

6. The apparatus of claim 1 wherein the communications link includes a Twinax cable.

7. The apparatus of claim 1 wherein the signal processing circuit of each testing module is configured to alter the data rate of the respective signal.

8. The apparatus of claim 1 wherein each testing module further includes:
   a computer interface configured to:
      communicatively couple the respective testing module of the each testing module with a host computing device;
      receive a set of modification parameters from the host computing device; and
   wherein the signal processing circuit of each testing module is configured to modify the signal received from the communications link according to predetermined modification parameters received by the computer interface.

9. The apparatus of claim 1 wherein each testing module is sufficiently small as to be hand held.

10. A method for testing the ports of a Small Form-Factor Pluggable Plus (SFP+) transceiver device comprising:
   receiving, by a first testing module, a signal from a first SFP+ transceiver device port;
   transmitting the signal to a second testing module via a communications link;
   performing signal compensation on the signal received by the second testing module to generate a compensated signal;
   modifying the compensated signal to generate a modified signal, by introducing signal distortion according to a set of predetermined modification parameters; and
   transmitting the modified signal to a second SFP+ transceiver device port.

11. The method of claim 10 wherein performing signal compensation includes performing Electrical Dispersion Compensation (EDC).

12. The method of claim 10 wherein modifying the compensated signal includes modifying the compensated signal in a manner to test compliance of the SFP+ transceiver device port with the Small Form-Factor Pluggable Plus (SFP+) standard, revision 1.3, dated 16 Feb. 2007.

13. The method of claim 10 wherein modifying the compensated signal includes modifying the compensated signal to include one of the three following forms of distortion:

pre-cursor signal distortion,
post-cursor signal distortion, or
substantially symmetrical signal distortion.

14. The method of claim 10 further including calibrating the set of predetermined modification parameters.

15. The method of claim 10 wherein modifying the compensated signal includes altering the data rate of the signal.

16. The method of claim 10 wherein the method is started and completed in less than two minutes.

17. The method of claim 10 further including:
receiving, by the second testing module, a signal from the second SFP+ transceiver device port;
transmitting the signal to the first testing module via a communication link;
performing signal compensation on the signal received by the first testing module;
modifying the compensated signal according to a set of predetermined modification parameters; and
transmitting the modified signal to the first SFP+ transceiver device port.

18. The method of claim 17 wherein at least one or more of the steps of claim 17 are performed before all the steps of claim 10 are fully completed.

19. The method of claim 10 further including:
communicatively coupling the second testing module with a host computing device;
receiving a set of modification parameters from the host computing device; and
wherein modifying the compensated signal includes modifying the compensated signal using the set of modification parameters received from the host computing device.

20. An apparatus for testing multiple ports comprising:
a first testing module;
a second testing module; and
a communicating means for conveying at least one signal between the first and the second testing modules;
wherein each of the testing modules includes:
an interfacing means for connecting the testing module to a port under test,
a compensating means for generating a compensated signal by performing signal compensation on a signal received from the other testing module,
a distorting means for generating a modified signal by introducing signal distortion to the compensated signal according to a set of predetermined modification parameters, and
a transmitting means for transmitting the modified signal, via the interfacing means, to the respective port under test.

* * * * *